T. J. PRICE.
Skimmer for Sugar Evaporators.
No. 44,657.
Patented Oct. 11, 1864.
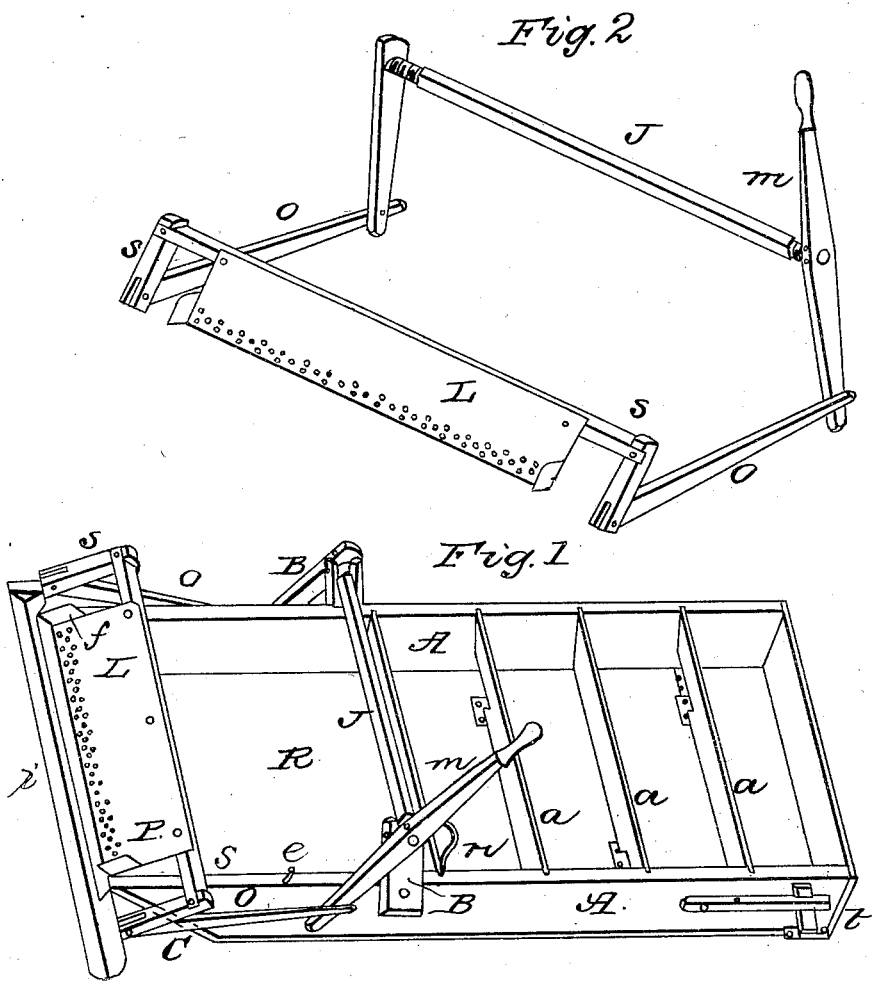
Witnesses
Inventor
Thos. J. Price

UNITED STATES PATENT OFFICE.

THOMAS J. PRICE, OF INDUSTRY, ILLINOIS.

IMPROVED SKIMMER FOR SUGAR-EVAPORATORS.

Specification forming part of Letters Patent No. 44,657, dated October 11, 1864; antedated November 15, 1863.

*To all whom it may concern:*

Be it known that I, THOS. J. PRICE, of Industry, in the county of McDonough, in the State of Illinois, have invented a new and useful Improvement in Evaporating-Pans for Saccharine and other Juices; and I do hereby declare that the following is a full, clear, and exact description of the same, reference being had to the accompanying drawings, making a part of this specification, in which—

Figure 1 is a perspective view of the improved evaporator. Fig. 2 is a perspective view of the skimming apparatus detached.

My invention consists, first, in a skimming apparatus by which the scum can all be removed at once; second, in a combination of parts to provide for the deposit of the scum and its speedy removal; third, in a combined arrangement for thoroughly defecating the juice and removing the feculent matter.

To enable others skilled in the art to make and use my invention, I will proceed to describe its construction and operation.

A A represent the sides of the evaporator.

B B are uprights made fast to the sides of the pan A A, to form suitable bearings for the rock-shaft J, which has levers firmly attached to each end at right angles, one extending above sufficient to form a handle, $m$. The lower ends are pivoted to the rods $o$ $o$, which are pivoted to the skimmer-frame S, to which the skimmer L is attached.

The front part of the pan (represented by R) is a cleansing or defecating apartment, the front end, C, of which is made sloping for the scum to deposit thereon. The rear part of the pan is divided into smaller apartments by cross-partitions $a$ $a$ $a$, which are slotted at their lower edges at alternate ends, to allow the sirup to pass from one division to the other. The first partition has a gate, $n$, to prevent the juice from passing out of the defecating-apartment until it is properly cleansed.

$i$ represents the gutter into which the scum is thrown by the skimmer L.

$t$ is the gate where the sirup is let out when sufficiently reduced.

The operation is as follows: The saccharine juice is introduced first into the front part of the defecating-apartment R in a continuous stream sufficient to supply the evaporation which causes the ebullition to be the greatest at the first cross-partition or rear portion of the defecating-apartment, which causes all the scum and feculent matter to deposit on the sloping end C, and when a sufficient quantity of scum is deposited the operator takes hold of the lever $m$ and moves it forward, which draws the skimmer-frame S by means of the connecting-rods $o$ $o$ back to the pin $e$, where it stops its backward movement and rotates sufficient to bring the lower edge of the skimmer L above the boiling liquid. Then the lever $m$ is brought back to its shown position, which causes the skimmer first to partly rotate and dip into the liquid and catch all the scum that may not be deposited on the sloping end, together with that that is deposited, and throw it out into the gutter $i$. The flanges P on the skimmer L prevent the scum from running off at the ends. After the juice is sufficiently defecated the gate $n$ is raised and the cleansed juice allowed to flow into the rear divisions, which have previously been supplied with common water, where it is concentrated to the proper degree for sirup or sugar. By this arrangement the juice is running into the evaporator in a continuous stream, and the sirup, when once concentrated to the proper degree, runs out in the same manner.

What I claim as new, and desire to secure by Letters Patent, is—

1. The rock-shaft J and rods $o$ $o$, in combination with the skimmer-frame S and skimmers L, as shown and described, for the purpose set forth.

2. The arrangement of the sloping end $c$ and gutter $i$, in combination with the rock-shaft J, skimmer-frame S, and skimmer L, substantially as and for the purpose set forth.

3. The combined arrangement of the defecating-apartment R, the skimming apparatus and sloping end, as shown and described, for the purpose specified.

THOS. J. PRICE.

Witnesses:
E. R. WIGHT,
ELEAZER VAIL.